US012792987B2

(12) United States Patent
Sikolas

(10) Patent No.: US 12,792,987 B2
(45) Date of Patent: Nov. 10, 2026

(54) CANOPUS AI PLATFORM

(71) Applicant: Antonios Sikolas, Miami, FL (US)

(72) Inventor: Antonios Sikolas, Miami, FL (US)

( * ) Notice: Subject to any disclaimer, the term of this patent is extended or adjusted under 35 U.S.C. 154(b) by 0 days.

(21) Appl. No.: 18/757,111

(22) Filed: Jun. 27, 2024

(65) Prior Publication Data

US 2025/0005477 A1 Jan. 2, 2025

Related U.S. Application Data

(60) Provisional application No. 63/523,577, filed on Jun. 27, 2023.

(51) Int. Cl.
*G06Q 10/0631* (2023.01)
*G06Q 10/20* (2023.01)

(52) U.S. Cl.
CPC ....... *G06Q 10/06315* (2013.01); *G06Q 10/20* (2013.01)

(58) Field of Classification Search
CPC ......................... G06Q 10/20; G06Q 10/06315
See application file for complete search history.

(56) References Cited

U.S. PATENT DOCUMENTS

2007/0159187 A1 7/2007 Chen et al.
2013/0014046 A1 1/2013 Watts et al.
2018/0201348 A1 7/2018 Delay et al.
2018/0321356 A1 11/2018 Kulkarni et al.
2021/0073060 A1* 3/2021 Grant .................. G06F 11/3089
2022/0114560 A1* 4/2022 Senzer ................... G07C 5/085
2023/0048481 A1 2/2023 Elder et al.
2023/0406464 A1* 12/2023 Molloy ................... B63B 79/30
2024/0144133 A1* 5/2024 Naslavsky ............ G06Q 50/40

FOREIGN PATENT DOCUMENTS

WO WO2021247961 12/2021
WO WO2025006786 1/2025

* cited by examiner

*Primary Examiner* — Deirdre D Hatcher
(74) *Attorney, Agent, or Firm* — Malloy & Malloy, P.L.; Peter Matos

(57) ABSTRACT

Systems and methods for maritime asset management. One system may comprise at least one data acquisition device; at least one server disposed in digital communication with the at least one data acquisition device; a cloud infrastructure configured to aggregate data and generate at least one maintenance insight; and at least one machine learning algorithm. Other systems may also comprise a software application, wherein the software application is configured to receive data from the at least one user and upload the data to the cloud infrastructure, the cloud infrastructure further configured to generate at least one other insight. Moreover, some embodiments of the present invention include a method comprising collecting data; sending the data to at least one server; uploading the data to a cloud infrastructure, the cloud infrastructure comprising at least one machine learning algorithm; analyzing the data; and generating at least one insight.

9 Claims, 13 Drawing Sheets

CANOPUS AI PLATFORM

CLAIM OF PRIORITY

The present patent application hereby makes a claim of priority to a U.S. provisional patent application having Ser. No. 63/523,577 and a filing date of Jun. 27, 2023, which is hereby incorporated in its entirety.

FIELD OF THE INVENTION

The present invention is directed to systems and methods for maritime asset management.

DESCRIPTION OF THE RELATED ART

In the maritime industry, maintaining optimal performance and ensuring the longevity of vessels (e.g., ships) are critical objectives that underpin the economic viability and operational safety of maritime operations. In this regard, optimal performance typically involves maximizing fuel efficiency, reducing operational costs, and ensuring that vessels can perform their intended functions—including maintaining optimal speed, ensuring the efficient operation of engines and auxiliary systems, and minimizing environmental impact by reducing emissions and adhering to international regulations—effectively under a variety of conditions. On the other hand, ensuring the longevity of such vessels typically involves protecting the vessel's structural integrity and mechanical systems from wear and tear over an extended period of time. This aspect is crucial, as it directly impacts the safety of the crew, the cargo, and the overall mission of the vessel itself. Long-lasting vessels require less frequent replacements and/or repairs, which translates to significant cost savings for vessel owners and operators. Additionally, a longer lifespan for such vessels means more extended periods of service, which is economically beneficial in terms of return on investment.

Fouling and Biofouling

Another set of prominent issues faced by owners and operators of maritime vessels are fouling and biofouling, both of which generally refer to the accumulation of unwanted materials on surfaces. While fouling generally describes this accumulation of unwanted materials, in the context of maritime vessels, fouling typically refers to the buildup of both organic and inorganic substances (e.g., algae, barnacles, rust, debris, sediment, etc.) on the hulls of maritime vessels. Biofouling, on the other hand, is a specific kind of fouling, and generally describes the accumulation of microorganisms, plants, algae, and animals on the hull of a maritime vessel which, like fouling, can significantly impact fuel efficiency and operational costs. In particular, fouling and biofouling increase the roughness of a maritime vessel's hull, leading to greater hydrodynamic drag. This increased resistance requires more engine power to maintain speed, thereby significantly raising fuel consumption—which, in turn, directly translates to increased operational costs (e.g., as fuel costs can constitute up to 50-70% of a maritime vessel's operating expenses—and/or reducing vessel speed. Due to the increased hydrodynamic drag, the additional fuel that must be burned results in higher emissions of greenhouse gases such as $CO_2$, which further contributes to global warming. Moreover, biofouling can facilitate the transfer of invasive aquatic species across different marine environments, disrupting local ecosystems and biodiversity. Furthermore, certain types of biofouling organisms can accelerate corrosion of the maritime vessel's hull, thereby leading to structural damage and reducing the vessel's lifespan.

To remedy such an issue, current solutions focus on the removal of such substances (e.g., biofouling organisms) from the maritime vessel's hull—which frequently requires dry docking and hull cleaning, two labor-intensive and costly procedures. In this regard, such solutions traditionally employ ultrasonic sensors, diver inspections, and specialized coatings (or a combination thereof) to detect and mitigate fouling—methods which are costly, labor-intensive, and sometimes even ineffective in providing a comprehensive assessment of fouling levels.

Ultrasonic sensors, used to detect fouling and biofouling by emitting high-frequency sound waves and measuring their reflections from the surface of a vessel's hull, allow for non-destructive and non-invasive testing of fouling and biofouling on the surface of a vessel's hull. However, despite the potential ability of such sensors to continually monitor these levels and provide real-time feedback, the installation of ultrasonic sensors and the associated hardware can be expensive, such sensors require regular maintenance and calibration to ensure accurate readings—thereby increasing operational costs—and interpretation of the data generated by such sensors requires a particular level of expertise, as incorrect interpretation of the data can lead to false positives or negatives.

Diver inspections, on the other hand, require a visual assessment of the extent and type of fouling, and oftentimes involve cleaning tasks using tools such as scrapers, brushes, or high-powered water jets. In this regard, diver inspections can be conducted in a wide variety of circumstances (i.e., such inspections do not require specialized infrastructure) and typically provide a thorough visual and tactile examination of the hull, identifying areas of heavy fouling and potential damage. However, despite the notion that divers are able to perform cleaning and minor repairs on-site—thereby promptly addressing any fouling present—diver inspections are frequently costly (i.e., due to the need for skilled labor and specialized equipment), dangerous (i.e., as working underwater poses significant risks to divers, including decompression sickness and entanglement hazards), labor-intensive and time-consuming (i.e., as large areas of a vessel's hull are difficult to be cleaned thoroughly and/or frequently), and environmentally hazardous (i.e., as disturbing biofouling organisms can lead to the spread of invasive species and environmental contamination).

Lastly, and with respect to antifouling coatings, such coatings are traditionally specialized paints applied to the hulls of ships for prevention of the accumulation of biofouling organisms. In this regard, these coatings either release biocides (i.e., that deter biofouling) or create a surface that reduces the adhesion strength of fouling organisms. Such coatings are typically effective in minimizing biofouling, decrease the frequency and intensity of hull cleaning—thereby saving time and costs associated with maintenance—and protects the hull from corrosion and damage caused by biofouling organisms—thereby extending the vessel's lifespan. However, despite the benefits such coatings offer, these coatings typically require dry docking for application thereto (and for re-application thereto); can release harmful chemicals into the water, thereby affecting marine ecosystems and leading to regulatory restrictions; and are not always effective, thereby leading to a need for supplementary methods of biofouling removal.

Predictive Maintenance

Yet another prominent issue faced by owners and operators of maritime vessels resides in the concept of predictive maintenance, which can generally be characterized as a proactive approach that aims to predict when equipment failures might occur and perform maintenance in a timely fashion to prevent them from occurring. As may be understood, this particular approach can help in minimizing unplanned downtime, reducing maintenance costs, and extending the lifespan of a variety of equipment. As also may be understood, predictive maintenance enables dynamic scheduling of maintenance tasks based on the actual condition of equipment, rather than fixed intervals—thereby ensuring maintenance is performed only when necessary—and enables the optimization of maintenance resources (e.g., spare parts, labor, downtime, etc.), as accurately predicting operational failures leads to a more efficient maintenance operation and, thus, reduced inventory costs. That said, and as also may be understood, predictive maintenance as it relates to maritime vessels is still in its infancy, as such systems and/or techniques are isolated to, at best, particular sub-systems of maritime vessels—and surely are not integrated throughout the vessels themselves.

In the alternative, modern-day maritime vessels necessarily rely on condition monitoring, which serves as the foundational activity that enables predictive maintenance to function effectively. Condition monitoring, which generally involves the continuous or periodic measurement and analysis of specific parameters of equipment to assess its health and performance, has a primary goal of detecting signs of wear, degradation, or impending failure early—thereby allowing for timely interventions. In this regard, condition monitoring frequently incorporates vibration analysis, or the monitoring of vibration patterns of rotating machinery (e.g., engines and pumps) to reveal imbalances, misalignments, or bearing failures; oil analysis, or an analysis of lubricating oil to detect contaminants, metal particles, and chemical changes that indicate engine wear or failure; and thermal imaging, or the use of infrared cameras and thermal imaging sensors to detect "hot spots" and other temperature anomalies in electrical systems, engines, and other components—all of the foregoing being essential to condition monitoring (and thus predictive maintenance) and necessarily being labor-intensive and costly. Moreover, existing predictive maintenance solutions often struggle with accuracy and reliability of predictions, particularly in the harsh and variable marine environment.

Accordingly, as the field currently stands, there is no consistent means of procuring high-quality, reliable data from diverse sensor systems and integrating the same into a unified platform for generating actionable insights as to maritime vessel performance, biofouling status, and/or predictive maintenance. Such a unified platform would need to be highly accurate to be effective, and continuous refinement and validation of any such predictive maintenance models is necessary to improve the reliability and applicability of such models. Thus, there is a need for an invention which further advances such systems and techniques in maritime vessels.

SUMMARY OF THE INVENTION

In view of the disadvantages that come with the use of presently available systems and methods for maritime asset management, the present invention is directed to at least one system and at least one method for maritime asset management which, inter alia, provide advanced solutions for performance optimization, fouling analysis, and predictive maintenance of at least one maritime vessel.

In more specific terms, the system for maritime asset management may comprise at least one data acquisition device, the at least one data acquisition device configured to collect data from at least one vessel. By way of non-limiting example, the at least one data acquisition device configured to monitor and collect data from at least one machine (i.e., "machinery data") aboard the at least one vessel—at least in part because such data is required for the predictive maintenance function of the present invention. By way of additional non-limiting example, and as it relates primarily to predictive maintenance, some embodiments of the present invention comprise at least one data acquisition device that is configured to measure one or more of the following readings and/or measurements: strain, ultrasonic signals, acceleration, vibrations, thermal properties, and viscosity. Some embodiments of the present invention also comprise at least one data acquisition device that is configured to measure currents and voltages of at least one electrical machine aboard the at least one vessel.

As may be understood, some embodiments of the present invention provide that the predictive maintenance function is split into a first predictive maintenance category (i.e., "electrical predictive maintenance") and a second predictive maintenance category (i.e., "generic predictive maintenance"). In this regard, and by way of non-limiting example, electrical predictive maintenance ("electrical PdM") utilizes electrical measurements (e.g., currents and voltages) to apply a state-of-the-art condition monitoring framework for electrical machines aboard the respective maritime vessels. On the other hand, and by way of additional non-limiting example, generic predictive maintenance ("generic PdM") refers to predictive maintenance regarding any other type of time-series data (ranging from engine temperature measurements to thicknesses of metals).

In particular, and as may be understood, the function of the present invention relating to electrical PdM may comprise sensory devices (e.g., the at least one data acquisition device), at least one interfacing board, at least one microcontroller (MCU), and at least one development board, and may also comprise various connectivity electronics and a low-level open systems interconnection (OSI) model. In this regard, and by way of non-limiting example, electrical PdM non-intrusively monitors current over conductors using current transformers (CTs), whereby the at least one interfacing board adjusts the CTs' output signals for compatibility with the MCU's analog-to-digital converter (ADC), where data is temporarily stored for future transmission. In such embodiments wherein electrical PdM non-intrusively monitors current over conductors using CTs, different CTs may be used based on the power and current of the respective motor (e.g., low current sensors produce output signals of about 50 mA, whereas higher currents produce output signals of about 5 A). Prior to initiating use of such CTs, however, the CTs must be characterized to ensure operation within the linear region, avoiding core saturation, and to confirm a specific bandwidth (e.g., at least 2 kHz). In this regard, characterization may be performed using reference equipment with low harmonic distortion, thereby covering a wide range of currents and frequencies. The at least one interfacing board, on the other hand, may, in some instances, be responsible for filtering and adjusting the output of the CT (alternating current or voltage) to the recommended direct voltage levels of the ADC (i.e., 0 to about 3.3 V). In this regard, and to avoid unwanted insertion of harmonic content, the electronic components may be tested and calibrated for operating in the linear region. Additionally, the at least one development board may be responsible for capturing and collecting samples—utilizing up to three separate ADCs in combination with direct memory access (DMA) to handle large volumes of data. The at least one development board may feature an integrated Ethernet® port for connectivity and may lack wireless transmission hardware—thereby necessitating the use of a particular chip (i.e., an ESP32) for WiFi® communication. As may be understood, preferred sampling frequency is 4 kHz, resulting in 720,000 samples per minute (i.e., 3 channels×4,000 samples/second×60 seconds). Communication between the MCU and the at least one server (described in detail immediately below) may be established through both wired and wireless connections. To alleviate the load on the main MCU, an ESP32 may be employed specifically for receiving data packets and transmitting them to the at least one server. A robust and continuous connection is maintained (e.g., using 8 kb packets, which include headers identifying the motor and the MCU). In this regard, the system of the present invention may support communication with the at least one server using both MQTT and HTTP protocols.

On the other hand, the function of the present invention relating to generic PdM generally focuses on any type of shipboard machinery that does not fall within the aforementioned "electrical" category. As an example of such machinery that does not fall within the aforementioned category, exhaust gas pipe (EGP) systems typically consist of at least one sensory device (e.g., the at least one data acquisition device), at least one interfacing board, at least one MCU board, and related connectivity electronics—similar to its electrical counterpart. In this regard, such sensory devices may be placed around the perimeter of the respective metal pipe(s) to non-intrusively measure its temperature and metal thickness (e.g., using thermocouples and eddy current sensors, respectively). By way of non-limiting example, the thermocouples measure the temperature of the metal surface and send the readings via a MAX6675 cold-junction-compensated K-type IC to the ESP32, which stores the data at a sampling frequency ranging from 0.1 to 2 Hz before transmitting them to the at least one server. On the other hand, and by way of additional non-limiting example, eddy sensors use a state-of-the-art driver to excite a planar coil approximately 3 cm by 3 cm in size. In this regard, the magnetic field produced by the coil induces eddy currents in the metal pipe, generating a corresponding magnetic field that the coil receives. The driver reads the induced voltage—which is proportional to the metal thickness—with an accuracy of approximately 0.1 mm. This measurement may be performed once every 24 hours to monitor erosion and corrosion of the EGP. Data is stored locally on the ESP32 and transmitted to the at least one server wirelessly (e.g., via Wi-Fi®), thereby supporting various WPA2 security protocols and PEAP.

Moreover, at least some embodiments of the present invention comprise at least one server aboard the at least one vessel, the at least one server disposed in digital communication with the at least one data acquisition device and configured to receive the data from the at least one vessel, oftentimes via the at least one data acquisition device. In this regard, and by way of non-limiting example, the at least one server functions primarily to ingest the data collected and received from the at least one vessel (e.g., via Ethernet® or WiFi®) to ultimately process electrical or generic time-series measurements. Generally, once the data is ingested by the at least one server (e.g., via the HTTP request performed by the data acquisition devices), the data is processed before being written locally.

As such, in at least some embodiments of the present invention, the at least one server is further configured to compress the data from the at least one vessel—at least in part to ensure that the eventual upload process (described in detail immediately below) is as fast as possible and does not consume a substantial amount of resources from the respective vessels' individual networks. At least some embodiments of the present invention may also provide for the at least one server being configured to separately process data about at least one electrical machine aboard the at least one vessel.

With specific regard to generic PdM data, such data may be enriched with timestamps and written in a local PostgreSQL database; periodically flushed into CSV files and queued for upload to a cloud infrastructure (described in detail below) whenever the at least one vessel's network conditions allow for it; upon being successfully uploaded, deleted from local storage; and, after a given retention period, deleted from the PostgreSQL database. The foregoing processes may be automated to run as scheduled CRON jobs, with extensive logging and at least one failsafe. On the other hand, as it relates to electrical PdM, the processing stage may involve additional steps, including: after receiving the raw time-series measurements, splitting the signals into time windows, extracting RMS values from them, and writing them in a table of the local PostgreSQL database, separate from the table where the generic PdM data is saved (e.g., because the table is connected to a local web application to be used by crew on-board the at least one vessel to ensure that measurements arrive as they should from the at least one data acquisition device and that the corresponding sensory capabilities are operational. Other than extracting RMS values, the time-series data may be compressed using advanced compression and encoding techniques that decrease their size significantly. These files may be uploaded to the cloud infrastructure in a fashion similar to that of the CSV files, again ensuring proper logging and failsafe.

As to fouling and performance analysis, different types of data may be required as inputs. Generally, however, such data (i.e., "non-machinery data") may be acquired via application programming interface (API) communications with satellite services through a data input service provided in the software application of the present invention (described in detail below), or, alternatively, via direct communication (e.g., via email) with one or more users of the software application of the present invention. In many cases, however, generating insights and/or reports (e.g., daily, weekly, and/or biweekly reports) about the at least one vessel is necessary, which can be provided to one or more users of the software application of the present invention via traditional methods (e.g., email) or by utilizing a particular page and/or sub-page of the software application itself. In this regard, and by way of non-limiting example, the one or more users may submit their own report(s), often via direct file upload or, alternatively, via an interactive form provided by the software application itself.

In furtherance of the above, some embodiments of the present invention provide for the inclusion of a software application configured to be accessed by at least one user from a client device, the software application configured to receive data from the at least one user. By way of non-limiting example, the client device may be configured to communicate with other client devices over a network. Furthermore, in such embodiments wherein the client device is configured to communicate with other devices over a network, the client device may also interact with an application server. By way of additional non-limiting example, the software application of the present invention may also provide the at least one user access with detailed reports and recommendations tailored to the at least one user's specific role(s) and/or credentials through a role-based access model.

Additionally, fouling data may be used for performance analysis as well as for exporting the Biofouling Management Plan (BFMP) and Record Book (BFRB). The necessary data for the BFMP and BFRB is divided into two categories: "on-water" and "dry dock." Data from the at least one vessel's operational routes when it is on the water may be included in the "on-water" category, whereas data from more infrequent dry docks may be included in the "dry dock" category. The majority of the data connected to the "on-water" category may be dedicated to the maintenance and cleaning of the anti-fouling systems (AFS), which can be thought of as a vessel's coating (AFC) and its marine growth prevention systems (MGPS). This data may include divers' inspections and cleanings, crew inspections, and crew cleanings. The at least one user may manually enter this data into the software application of the present invention after performing the relevant activity, or it can be done automatically by submitting a report to the software application of the present invention. Additional data may be relevant to the information about the existing hull and niche areas of the at least one vessel and may be added by the at least one user through the relevant form of the software application of the present invention. The second category of data may pertain to ship installations, which may or may not be associated with fouling, as well as cleaning and maintenance of ship components. When the relevant activity is completed, the at least one user may be able to upload the data through the software application of the present invention.

Similar to the above, additional performance analysis data may be collected for use in connection with the present invention. The first source of this data includes the general particulars, shop and sea trials, and diagrams that outline the characteristics of the at least one vessel's geometry. This has to do with initializing the at least one vessel's attributes for performance analysis (e.g., during the onboarding process). The second source is via automatic identification system (AIS) data, which is collected from at least one satellite service and may be used to significantly improve the resolution of reported data regarding the location(s) of the at least one vessel during its respective voyage(s). The third source of this data may include weather data, which is selected for the location(s) of the merged AIS and report data, and is itself acquired from two types of sources—the first consisting of weather data that is registered in report by the respective crew onboard, and the second being the utilization of weather monitoring and forecasting services, namely "Copernicus," "Stormglass" and "Open Weather." By bridging these services with the software application of the present invention through an API provider, data can be obtained for all necessary variables needed for proper functioning of the system. The consistency of both sources is reviewed, where possible, in order to ensure the outcome reliability.

Moreover, at least one embodiment of the present invention provides that the at least one server is further configured to upload the data from the at least one server to a cloud infrastructure, the cloud infrastructure configured to aggregate the data from the at least one vessel. By way of non-limiting example, in such embodiments wherein the present invention incorporates a software application, the software application configured to be accessed by at least one user from a client device and configured to receive data from the at least one user, the software application is further configured to upload the data from the at least one user to the cloud infrastructure, the cloud infrastructure further configured to aggregate the data from the at least one user.

In many embodiments of the present invention, the cloud infrastructure comprises at least one machine learning algorithm. By way of non-limiting example, in such embodiments wherein the cloud infrastructure comprises at least one machine learning algorithm, the at least one machine learning algorithm is configured to analyze the data from the at least one vessel via a comparison of historical data over a predetermined period of time to establish at least one baseline measurement. In some such embodiments, the at least one machine learning algorithm initiates analyzing the relevant data as soon as the data arrives from the at least one server (i.e., to generate critical insights on vessel performance, fouling condition and/or onboard machinery health). By way of additional non-limiting example, in such embodiments wherein the present invention incorporates a software application, the software application configured to be accessed by at least one user from a client device and configured to receive data from the at least one user, the at least one machine learning algorithm is further configured to analyze the data from the at least one user via a comparison of historical data over a predetermined period of time to establish at least one baseline measurement.

In furtherance of the above, and while it is crucial to first obtain the relevant data, as may be understood, the present invention may also provide for a period of time wherein the at least one machine learning algorithm is "trained" to establish baseline values for comparison thereto. By way of non-limiting example, this period of time may be about six months. During this period, and by way of non-limiting example, the system of the present invention may adjust and calibrate to the specific operational characteristics of the at least one vessel by utilizing the incoming data. To expedite this process, historical data related to vessel performance, fouling, and machinery maintenance may be utilized. This historical data may allow the at least one machine learning algorithm (e.g., both ML and standard optimization) to quickly learn and adapt, thereby shortening the time needed to generate accurate and actionable insights.

For the purposes of so-called electrical PdM, historical data may be essential for setting up one or more baselines, trying to assess the current state of the at least one vessel's electrical machinery, and also identifying potential faults that occurred in the past. The desired result of this process may be analytical thresholds (frequency-threshold pairs) per electrical sensor per electrical machine, so that anomaly detection can be performed on live data to assess if the condition of the one or more machines (e.g., at least one electrical machine) remains constant over time or starts deteriorating. Using published, peer-reviewed literature, the present invention may be able to identify patterns in the evolution of FFT magnitudes at specific frequency bands over time and characterize them as faults. In particular, the present invention may even be able to identify specific types of faults, depending on the recognized pattern. For the purposes of so-called generic PdM, a more generic and automated analysis approach may be followed, as it may need be able to incorporate many different types of systems or machines. More specifically, a multivariate time-series anomaly detection (MVAD) model may be utilized to automatically identify faults in sets of time-series. The time-series data may pass through a 1-dimensional (1-D) convolutional filter for feature engineering, and then may be fed to two distinct graph attention network (GATv2) layers so that information about the spatial and temporal correlations between them can be extracted. The produced results then may pass through recurrent neural networks, and the entire architecture may be trained to jointly predict the next time-series values via forecasting and reconstruction. Depending on how far off the predicted values are in comparison to the actual measured values from the sensors, anomalies can be identified.

With the above understood, training the at least one machine learning algorithm is essential before the at least one machine learning algorithm can perform inference on live data. Notably, even though the training process may be expedited in certain circumstances, providing past examples of system failures is not a prerequisite for the at least one machine learning algorithm of the present invention. Instead, the at least one machine learning algorithm may be trained with time-series data that corresponds to the normal or practically normal operation of the respective system(s). Based on this, the at least one machine learning algorithm may be able to predict which values or patterns are significantly different from what is considered normal, and, accordingly, classify them as faults.

For the analysis of historical data, all aforementioned historical data collections are utilized (general particulars; reports, such as noon reports; AIS; weather; crew reports; etc.) along with several vessel geometric parameters which are required for the at least one machine learning algorithm. In this regard, the present invention utilizes a custom-made application which is employed for the digitalization of existing data collection and the entry of human-calculated geometric parameters—thereby breaking down the historical data into several discrete values (e.g., several day-spanning trips).

Based on the geometric parameters of the at least one vessel and specific weather conditions along the historical routes, an initial estimation of the brake horsepower (BHP) may be calculated. BHP is derived from several components of the forces acting on the at least one vessel during operation in open sea. These components include the smooth surface resistance of the at least one vessel during calm weather, encompassing frictional, wave-making, viscous pressure, bulbous bow, and appendage resistances. These resistances may be initially estimated using the Holtrop and Mennen method.

In calm water resistance, the present invention provides for the application of time and sea environment-dependent excess roughness due to fouling and paint/surface deterioration. The initial calculation of these factors may be estimated using a population evolution model of species contributing to the fouling effect (e.g., barnacles, algae, and mussels). The evolution model may consider the sea environment during the vessel route (e.g., temperature and salinity), species properties and cross-competition, and antifouling methods used by the respective crew(s). The fouling evolution may be validated through diver reports, and when the hull is cleaned, the excess roughness is reset to baseline based on the at least one vessel's dry-docking history.

The evolution model may estimate species coverage and geometrical properties, which may then be transformed into an excess surface resistance coefficient contributing to the total resistance. Finally, the present invention may provide for an estimation of the weather contribution to the resistance using the ITTC-75 vessel type-specific air resistance model and the CTH vessel-wave interaction model.

The estimated BHP may be transformed into engine power consumption using the hull and propeller efficiency coefficient. This coefficient may be estimated using the Holtrop and Mennen method, corrected for the thrust loading coefficient for the specific propeller properties, and the effect of fouling on the propeller blades. The engine power consumption may then be converted into fuel consumption using the engine efficiency curve, which depends on the engine load. The engine efficiency curve may be validated by converting it into the specific fuel oil consumption (SFOC) based on the calorific value of the fuel type reported by the respective crew(s). This sequence of computations may result in several observable variables: fouling evolution, power consumption, SFOC, and fuel consumption. These observables may then be compared with the historical data to estimate the residuals.

The present invention may further assist at least one user (of the software application of the present invention) in visualizing trip data, analyzing model-independent insights, and configuring several meta-parameters of the models at play. The visualizations may display all trip details (e.g., location, velocity, weather, trim, crew comments, fuel and power consumption of main and auxiliary engines, fueling and wastes, etc.), and may provide insights into fouling evolution by estimating total fuel energy consumption over time and the trim effect by comparing total fuel energy consumption with different trim angles. One or more users may be able to adjust different model configurations and parameters for wave resistance and hull/propeller efficiency.

Another feature of the present invention is the ability to choose weather data that differs from crew reports and compare it with different weather services. As data and models have intrinsic and extrinsic uncertainties, the present invention may introduce one or more models that use specific vessel features and data to fit any residuals. By discerning training and validation sets of data and residuals, the present invention may infer vessel-specific parameters, which may be written to the database. One of the most important factors in the uncertainty of vessel performance is the trim, as no universal model exists in the literature at present. In its first iteration, the models of the present invention may estimate the trim effect and then any other residuals.

Furthermore, many embodiments of the present invention provide that the cloud infrastructure is further configured to generate at least one maintenance insight about the at least one vessel, the at least one maintenance insight stored in at least one virtual database and, in some cases, comprising information about at least one electrical machine aboard the at least one vessel. By way of non-limiting example, in such embodiments wherein the present invention incorporates a software application, the software application configured to be accessed by at least one user from a client device and configured to receive data from the at least one user, the cloud infrastructure is further configured to generate at least one other insight, the at least one maintenance insight and the at least one other insight stored in at least one virtual database. By way of additional non-limiting example, the at least one other insight may comprise fouling and/or performance information about the at least one vessel. In general, however, in many embodiments of the present invention wherein the cloud infrastructure generates at least one insight, whether it be at least one maintenance insight and/or at least one other insight, the at least one maintenance insight and/or at least one other insight may each comprise at least one qualitative insight and at least one quantitative insight. In several cases, the storage of the at least one insight (i.e., the at least one maintenance insight and/or at least one other insight) may connect to the software application of the present invention (i.e., the at least one insight feeds the "backend" of the software application for user viewing).

With regard to the cloud infrastructure itself, and by way of non-limiting example, the cloud infrastructure's "pipeline" may be composed of a multi-hop data processing structure, known as a "medallion architecture." The term "multi-hop" is used to explain that data are serially processed in multiple levels, whereas the term "medallion" implies that these levels are namely the Bronze, Silver and Gold Layer. For the purposes of receiving, storing and handling data, as well as managing workloads, a Lakehouse architecture may be employed, which combines the storing capabilities of a Data Lake (i.e., a repository of data in their original raw form) with the data management of a data warehouse (i.e., an organized set of structured data).

The data processing may commence with the arrival of new CSV files containing time-series data inside a "landing" ADLS container. Upon this arrival, a trigger is activated, which may prompt the "pipeline" for processing the data contained in the respective ingested file(s). This data may correspond to time-dependent measurements of various sensors (e.g., the at least one data acquisition device) that have been installed aboard the at least one vessel. Each sensor may be mapped to a specific subsystem where it resides, along with other sensors.

The purpose of the Bronze Layer may be the ingestion of the raw CSV file data. As a failsafe, each file may be checked to determine whether the file contains any new sensors or subsystems (for example, if a new subsystem has been added, or if a new sensor has been recently installed on the at least one vessel) that have been not recorded in the Lakehouse or the PostgreSQL database. On the condition that a new sensor and/or subsystem is detected, it is added to the existing Lakehouse and written in the database. The second step may be the calculation of the running hours corresponding to each sensor, which is equal to the time interval that the sensor is considered to be operational. After initial ingestion, the objective of the Silver Layer may be to pre-process the data and prepare the data for machine learning workloads. During this processing, sensor-specific parameters that are determined based on each sensor's details may be applied to the corresponding data. The pre-processing procedure involves sensor-specific aggregations, transformations (e.g. min-max scaling), as well as compilation of new datasets which can be directly fed to the one or more machine learning models. Using the fine-grained data of the Silver Layer, the aforementioned at least one machine learning algorithm is utilized for inference. Based on its training, it classifies each data point corresponding to a single timestamp as anomalous or normal. The results of the at least one machine learning algorithm's application are then written in the architecture's Gold Layer, so that they can be fed to the PostgreSQL database and, through it, displayed in the software application.

When it comes to live electrical PdM processing pipeline, it may be initiated by a trigger that fires whenever new files appear in a landing container of the Data Lakehouse. These files correspond to the compressed data created by the aforementioned at least one server aboard the at least one vessel and uploaded to the cloud infrastructure from the at least one vessel.

The first step of the pipeline may be the extraction of the metadata embedded in the respective files. This metadata is written by the at least one server's services during the initial compression of the files and are essential for their decompression and consequent reconstruction of the time-series they contain. In particular, they correspond to a scaling factor used to transform the data into integers, the sampling rate of the data acquisition device, as well as the timestamps corresponding to the beginning and the end of the sampling process. The reason why redundant information is included in the metadata (since the end of the sampling process can be inferred through the volume of data, the timestamp corresponding to the beginning of the sampling process and the sampling rate) is purely related to sanity checks when it comes to the quality of the received data.

Using this metadata, the original time-series can be reconstructed for each sensor included in each file. Then, a Fast Fourier Transform (FFT) may be applied on each time-series individually to obtain the magnitudes of their corresponding frequencies across the entire frequency spectrum. The magnitudes may be normalized, so that they can be compared to the results obtained from other respective files. This transformed data may be utilized to identify potential issues in the at least one electrical machine, by comparing them to previous readings as well as the baselines that were created during the processing of historical data and the baselines published in peer-reviewed literature. This constitutes the "anomaly detection" task for the electrical PdM problem.

Apart from the FFT transformation, the Total Harmonic Distortion (THD) of the signal may also be calculated from the pipeline. Even though it is not a self-sufficient diagnostic tool, the THD can be used in conjunction with observations on the FFT-transformed results to increase the certainty of classifying at least one electrical machine's current state as potentially faulty or not. All calculated results are written in the PostgreSQL database which feeds the software application's backend, so that they can be served to the at least one user of the software application, including explanations about possible identified faults.

Moreover, through use of the present invention, the management of biofouling documentation, including filling out, maintaining, and tracking the BFMP and BFRB, is simplified. Based on the at least one vessel details provided through one or more reports, and by acquiring additional information about the at least one vessel through relevant application forms, a comprehensive profile of the at least one vessel's fouling management is created. The operational profile of the at least one vessel is defined, acting as the basis for selecting the AFS. The at least one user may declare any existing hull and niche areas where biofouling may occur on the at least one vessel, and documents any procedures done on the at least one vessel, such as installations and cleanings. This can be done either by filling the relevant form or by directly uploading crew and diver reports to the software application.

To retrieve useful data for the BFMP, BFRB, and vessel performance models described earlier, state-of-the-art technologies such as optical character recognition (OCR), Large Language Models (LLM), and retrieval-augmented generation (RAG) may be used. If the input is in a handwritten report or image, OCR may be used to extract the text information. The final dataset, describing all the information regarding fouling condition, evolution, and preventive measures strategies, may be stored in the at least one virtual database and can be retrieved at will.

After acquiring all the necessary information, a custom-made internal software application may be used to produce the contents of the BFMP and BFRB. The at least one vessel particulars, operational profile, and hull and niche areas of the at least one vessel are loaded and presented in tables. The AFS properties may be formulated based on the provided installation information, using LLMs, separately for the selected AFC and MGPS, along with the relevant areas and dates of installment, and the means and frequency of required maintenance. Planned management actions required per ship area may be formulated using LLMs, along with any additional procedures proposed by the IMO (considering waste management, safety procedures, and crew familiarization).

Via use of the above, all of the above-noted information may be neatly organized into a single PDF document that constitutes the ship-specific BFMP document required by the IMO. The list of actions relevant to installations and cleaning procedures may be organized in another table, in chronological order, which constitutes the BFRB.

This comprehensive digital approach, which can be applied to specific vessels, allows for improved decision-making on maintenance and cleaning, optimizing fouling management by automating processes, refining monitoring and forecasting capabilities, and enabling the creation of a digital twin of the at least one vessel's operational profile. This maintains optimal ship operation with minimal crew involvement, thereby optimizing overall maritime operations.

Lastly, as it relates to the software application of the present invention, the software application may itself comprise at least one page, and, in some embodiments, up to six distinct pages. By way of non-limiting example, the software application may itself comprise a data input page, designed to streamline the process of submitting reports and other pertinent data; an overview page, the overview page configured to present a map with the last reported location of the at least one vessel available to the at least one user (i.e., depending on their access); a predictive maintenance page, which is configured to offer a review of the at least one vessel's subsystems and their working conditions; a fouling page, the fouling page configured to handle the relevant data and info related to the fouling of the at least one vessel, thereby simplifying its management and boosting operational efficiency; a compliance page, the compliance page configured to depict the at least one vessel's current CII score, as well as a detailed breakdown of its values across the months of a given year; and performance optimization page, the performance optimization page configured to depict the at least one vessel's baseline power as a function of velocity and engine efficiency curves together with the data obtained from the respective crew(s) through the reporting features offered by the present invention.

The attendant method of the present invention, on the other hand, includes a method for maritime asset management. In this regard, one or more embodiments of the present invention include a method comprising: collecting data from at least one vessel via at least one data acquisition device; sending the data from the at least one vessel to at least one server aboard the at least one vessel, the at least one server disposed in digital communication with the at least one data acquisition device; uploading the data from the at least one server to a cloud infrastructure, the cloud infrastructure comprising at least one machine learning algorithm and configured to aggregate the data from the at least one vessel; analyzing the data from the at least one vessel via the at least one machine learning algorithm; and generating at least one insight about the at least one vessel. As explained herein, and by way of non-limiting examples, the attendant method of the present invention may comprise an at least one server that is further configured to compress the data from the at least one vessel; and the generation of at least one insight which itself comprises at least one qualitative insight and at least one quantitative insight—and, in at least some embodiments, at least one insight which itself comprises at least one maintenance insight about the at least one vessel and at least one other insight. Moreover, the attendant method of the present invention may further comprise uploading data from at least one user of a software application to the cloud infrastructure, the software application configured to be accessed by at least one user from a client device and to receive data from the at least one user. In such an embodiment, the cloud infrastructure may be further configured to aggregate the data from the at least one user. Continuing on, such an embodiment may further comprise the step of analyzing the data from the at least one user via the at least one machine learning algorithm.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The invention now will be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
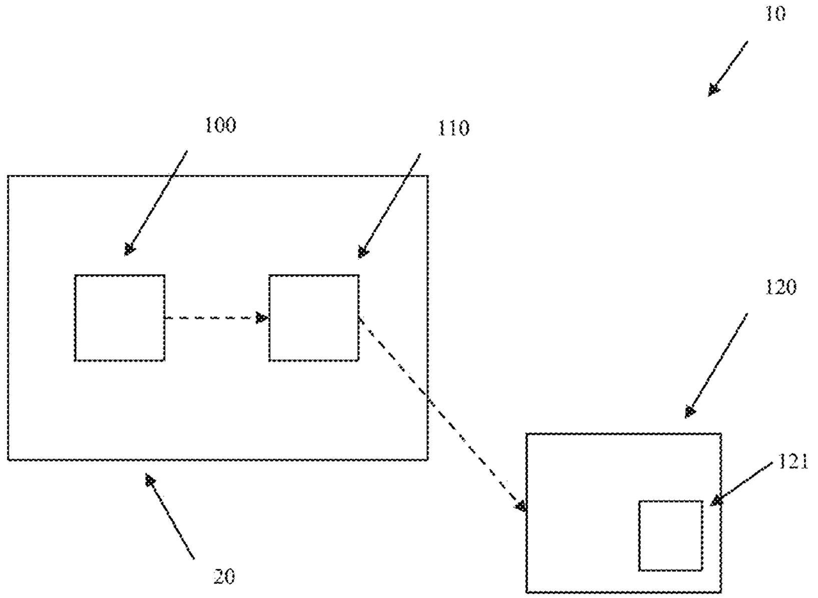
FIG. 1 is a schematic representation in block form of a portion of at least one embodiment of the present invention.
Figure 8:
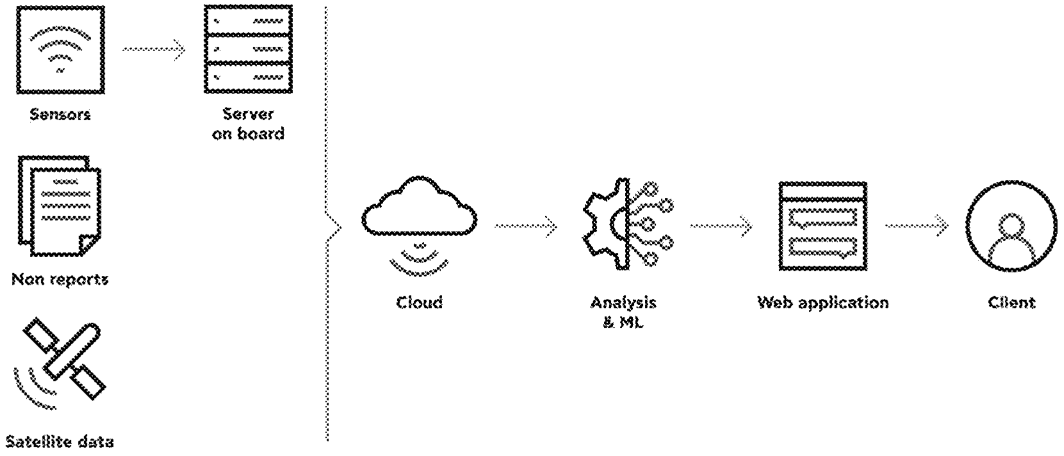
FIG. 8 is a schematic representation of at least one embodiment of the present invention.

Turning now descriptively to the figures, FIG. 8 generally illustrates at least one embodiment of the present invention, whereas FIG. 1 more specifically illustrates a system for maritime asset management 10 which may comprise at least one data acquisition device 100, the at least one data acquisition device 100 configured to collect data from at least one vessel 20. By way of non-limiting example, the at least one data acquisition device 100 is configured to monitor and collect data from at least one machine (i.e., "machinery data") aboard the at least one vessel 20—at least in part because such data is required for the predictive maintenance function of the present invention. By way of additional non-limiting example, and as it relates primarily to predictive maintenance, some embodiments of the present invention comprise at least one data acquisition device that is configured to measure one or more of the following readings and/or measurements: strain, ultrasonic signals, acceleration, vibrations, thermal properties, and viscosity. Some embodiments of the present invention also comprise at least one data acquisition device that is configured to measure currents and voltages of at least one electrical machine aboard the at least one vessel.

As may be understood, some embodiments of the present invention provide that the predictive maintenance function is split into a first predictive maintenance category (i.e., "electrical predictive maintenance") and a second predictive maintenance category (i.e., "generic predictive maintenance"). In this regard, and by way of non-limiting example, electrical predictive maintenance ("electrical PdM") utilizes electrical measurements (e.g., currents and voltages) to apply a state-of-the-art condition monitoring framework for electrical machines aboard the respective maritime vessels. On the other hand, and by way of additional non-limiting example, generic predictive maintenance ("generic PdM") refers to predictive maintenance regarding any other type of time-series data (ranging from engine temperature measurements to thicknesses of metals).

Figure 9:
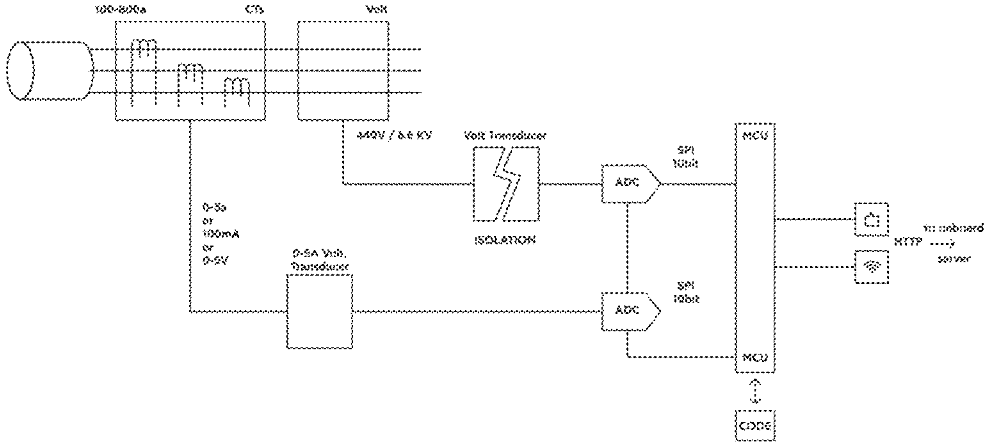
FIG. 9 is a schematic representation of at least one embodiment of the present invention.

In particular, and as may be understood, the function of the present invention relating to electrical PdM may comprise sensory devices (e.g., the at least one data acquisition device), at least one interfacing board, at least one microcontroller (MCU), and at least one development board, and may also comprise various connectivity electronics and a low-level open systems interconnection (OSI) model. In this regard, at least one embodiment of the present invention that performs such a function is illustrated in FIG. 9. Further, and by way of non-limiting example, electrical PdM non-intrusively monitors current over conductors using current transformers (CTs), whereby the at least one interfacing board adjusts the CTs' output signals for compatibility with the MCU's analog-to-digital converter (ADC), where data is temporarily stored for future transmission. In such embodiments wherein electrical PdM non-intrusively monitors current over conductors using CTs, different CTs may be used based on the power and current of the respective motor (e.g., low current sensors produce output signals of about 50 mA, whereas higher currents produce output signals of about 5 A). Prior to initiating use of such CTs, however, the CTs must be characterized to ensure operation within the linear region, avoiding core saturation, and to confirm a specific bandwidth (e.g., at least 2 kHz). In this regard, characterization may be performed using reference equipment with low harmonic distortion, thereby covering a wide range of currents and frequencies. The at least one interfacing board, on the other hand, may, in some instances, be responsible for filtering and adjusting the output of the CT (alternating current or voltage) to the recommended direct voltage levels of the ADC (i.e., 0 to about 3.3 V). In this regard, and to avoid unwanted insertion of harmonic content, the electronic components may be tested and calibrated for operating in the linear region. Additionally, the at least one development board may be responsible for capturing and collecting samples—utilizing up to three separate ADCs in combination with direct memory access (DMA) to handle large volumes of data. The at least one development board may feature an integrated Ethernet® port for connectivity and may lack wireless transmission hardware—thereby necessitating the use of a particular chip (i.e., an ESP32) for WiFi® communication. As may be understood, preferred sampling frequency is 4 kHz, resulting in 720,000 samples per minute (i.e., 3 channels×4,000 samples/second×60 seconds). Communication between the MCU and the at least one server (described in detail immediately below) may be established through both wired and wireless connections. To alleviate the load on the main MCU, an ESP32 may be employed specifically for receiving data packets and transmitting them to the at least one server. A robust and continuous connection is maintained (e.g., using 8 kb packets, which include headers identifying the motor and the MCU). In this regard, the system of the present invention may support communication with the at least one server using both MQTT and HTTP protocols.

On the other hand, the function of the present invention relating to generic PdM generally focuses on any type of shipboard machinery that does not fall within the aforementioned "electrical" category. As an example of such machinery that does not fall within the aforementioned category, exhaust gas pipe (EGP) systems typically consist of at least one sensory device (e.g., the at least one data acquisition device), at least one interfacing board, at least one MCU board, and related connectivity electronics—similar to its electrical counterpart. In this regard, such sensory devices may be placed around the perimeter of the respective metal pipe(s) to non-intrusively measure its temperature and metal thickness (e.g., using thermocouples and eddy current sensors, respectively). By way of non-limiting example, the thermocouples measure the temperature of the metal surface and send the readings via a MAX6675 cold-junction-compensated K-type IC to the ESP32, which stores the data at a sampling frequency ranging from 0.1 to 2 Hz before transmitting them to the at least one server. On the other hand, and by way of additional non-limiting example, eddy sensors use a state-of-the-art driver to excite a planar coil approximately 3 cm by 3 cm in size. In this regard, the magnetic field produced by the coil induces eddy currents in the metal pipe, generating a corresponding magnetic field that the coil receives. The driver reads the induced voltage—which is proportional to the metal thickness—with an accuracy of approximately 0.1 mm. This measurement may be performed once every 24 hours to monitor erosion and corrosion of the EGP. Data is stored locally on the ESP32 and transmitted to the at least one server wirelessly (e.g., via Wi-Fi®), thereby supporting various WPA2 security protocols and PEAP.

Figure 10:
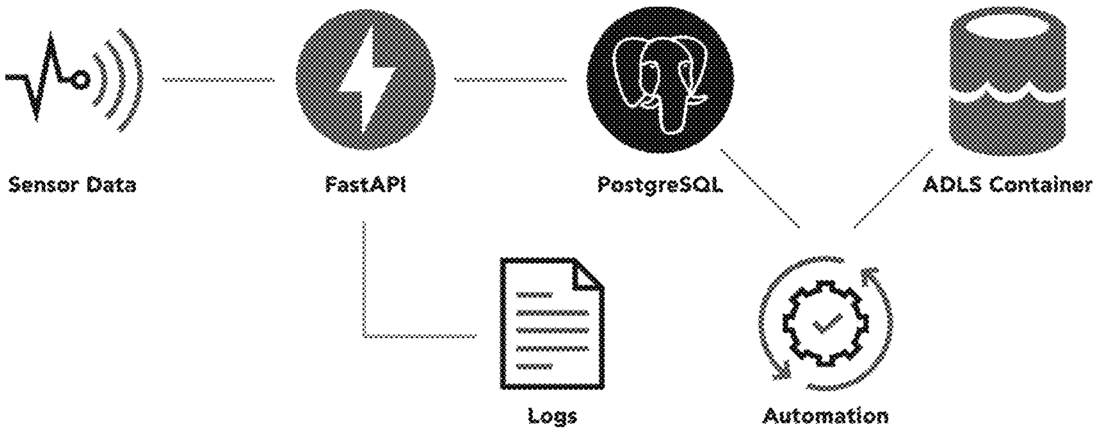
FIG. 10 is a schematic representation of at least one embodiment of the present invention.

Moreover, and as also seen in FIG. 1, at least some embodiments of the present invention comprise at least one server 110 aboard the at least one vessel 20, the at least one server 110 disposed in digital communication with the at least one data acquisition device 100 and configured to receive the data from the at least one vessel 20, oftentimes via the at least one data acquisition device 100. In this regard, at least one embodiment of the present invention incorporating such an at least one server is illustrated in FIG. 10. Further, and by way of non-limiting example, the at least one server functions primarily to ingest the data collected and received from the at least one vessel (e.g., via Ethernet® or WiFi®) to ultimately process electrical or generic time-series measurements. Generally, once the data is ingested by the at least one server (e.g., via the HTTP request performed by the data acquisition devices), the data is processed before being written locally.

As such, in at least some embodiments of the present invention, the at least one server is further configured to compress the data from the at least one vessel—at least in part to ensure that the eventual upload process (described in detail immediately below) is as fast as possible and does not consume a substantial amount of resources from the respective vessels' individual networks. At least some embodiments of the present invention may also provide for the at least one server being configured to separately process data about at least one electrical machine aboard the at least one vessel.

With specific regard to generic PdM data, such data may be enriched with timestamps and written in a local PostgreSQL database; periodically flushed into CSV files and queued for upload to a cloud infrastructure (described in detail below) whenever the at least one vessel's network conditions allow for it; upon being successfully uploaded, deleted from local storage; and, after a given retention period, deleted from the PostgreSQL database. The foregoing processes may be automated to run as scheduled CRON jobs, with extensive logging and at least one failsafe. On the other hand, as it relates to electrical PdM, the processing stage may involve additional steps, including: after receiving the raw time-series measurements, splitting the signals into time windows, extracting RMS values from them, and writing them in a table of the local PostgreSQL database, separate from the table where the generic PdM data is saved (e.g., because the table is connected to a local web application to be used by crew on-board the at least one vessel to ensure that measurements arrive as they should from the at least one data acquisition device and that the corresponding sensory capabilities are operational. Other than extracting RMS values, the time-series data may be compressed using advanced compression and encoding techniques that decrease their size significantly. These files may be uploaded to the cloud infrastructure in a fashion similar to that of the CSV files, again ensuring proper logging and failsafe.

As to fouling and performance analysis, different types of data may be required as inputs. Generally, however, such data (i.e., "non-machinery data") may be acquired via application programming interface (API) communications with satellite services through a data input service provided in the software application of the present invention (described in detail below), or, alternatively, via direct communication (e.g., via email) with one or more users of the software application of the present invention. In many cases, however, generating insights and/or reports (e.g., daily, weekly, and/or biweekly reports) about the at least one vessel is necessary, which can be provided to one or more users of the software application of the present invention via traditional methods (e.g., email) or by utilizing a particular page and/or sub-page of the software application itself. In this regard, and by way of non-limiting example, the one or more users may submit their own report(s), often via direct file upload or, alternatively, via an interactive form provided by the software application itself.

Figure 6:
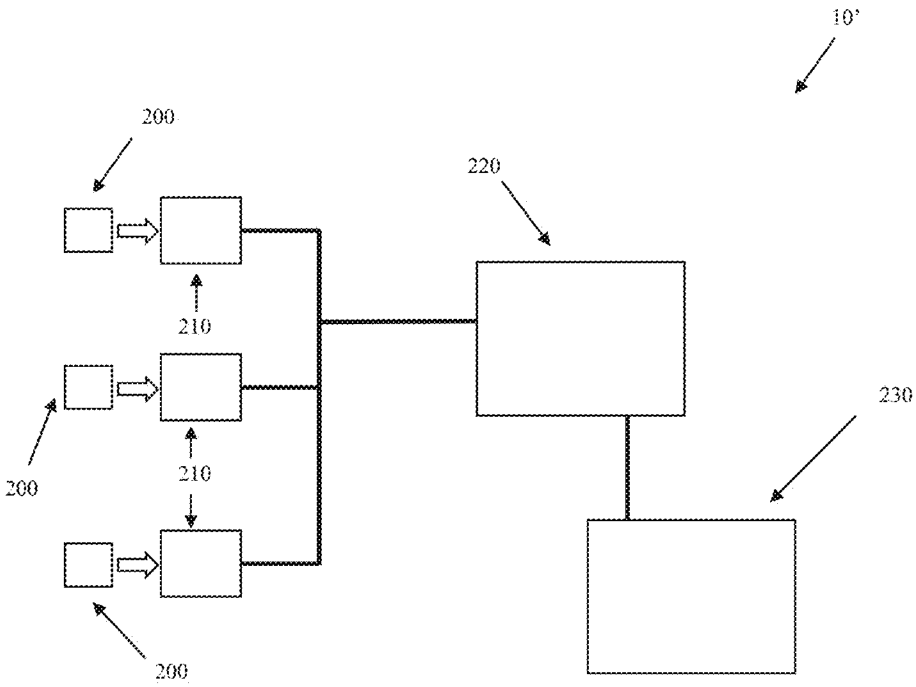
FIG. 6 is a schematic representation in block form of at least one embodiment of the present invention.

In furtherance of the above, and as seen in FIG. 6, some embodiments of the present invention provide for the inclusion of a software application 200 configured to be accessed by at least one user from a client device 210, the software application 200 configured to receive data from the at least one user. By way of non-limiting example, the client device 210 may be configured to communicate with other client devices over a network 220. Furthermore, in such embodiments wherein the client device 210 is configured to communicate with other devices over a network 220, the client device may also interact with an application server 230. By way of additional non-limiting example, the software application of the present invention may also provide the at least one user access with detailed reports and recommendations tailored to the at least one user's specific role(s) and/or credentials through a role-based access model.

Additionally, fouling data may be used for performance analysis as well as for exporting the Biofouling Management Plan (BFMP) and Record Book (BFRB). The necessary data for the BFMP and BFRB is divided into two categories: "on-water" and "dry dock." Data from the at least one vessel's operational routes when it is on the water may be included in the "on-water" category, whereas data from more infrequent dry docks may be included in the "dry dock" category. The majority of the data connected to the "on-water" category may be dedicated to the maintenance and cleaning of the anti-fouling systems (AFS), which can be thought of as a vessel's coating (AFC) and its marine growth prevention systems (MGPS). This data may include divers' inspections and cleanings, crew inspections, and crew cleanings. The at least one user may manually enter this data into the software application of the present invention after performing the relevant activity, or it can be done automatically by submitting a report to the software application of the present invention. Additional data may be relevant to the information about the existing hull and niche areas of the at least one vessel and may be added by the at least one user through the relevant form of the software application of the present invention. The second category of data may pertain to ship installations, which may or may not be associated with fouling, as well as cleaning and maintenance of ship components. When the relevant activity is completed, the at least one user may be able to upload the data through the software application of the present invention.

Similar to the above, additional performance analysis data may be collected for use in connection with the present invention. The first source of this data includes the general particulars, shop and sea trials, and diagrams that outline the characteristics of the at least one vessel's geometry. This has to do with initializing the at least one vessel's attributes for performance analysis (e.g., during the onboarding process). The second source is via automatic identification system (AIS) data, which is collected from at least one satellite service and may be used to significantly improve the resolution of reported data regarding the location(s) of the at least one vessel during its respective voyage(s). The third source of this data may include weather data, which is selected for the location(s) of the merged AIS and report data, and is itself acquired from two types of sources—the first consisting of weather data that is registered in report by the respective crew onboard, and the second being the utilization of weather monitoring and forecasting services, namely "Copernicus," "Stormglass" and "Open Weather." By bridging these services with the software application of the present invention through an API provider, data can be obtained for all necessary variables needed for proper functioning of the system. The consistency of both sources is reviewed, where possible, in order to ensure the outcome reliability.

Moreover, and as seen in FIG. 1, at least one embodiment of the present invention provides that the at least one server 110 is further configured to upload the data from the at least one server 110 to a cloud infrastructure 120, the cloud infrastructure 120 configured to aggregate the data from the at least one vessel 20. By way of non-limiting example, in such embodiments wherein the present invention incorporates a software application, the software application configured to be accessed by at least one user from a client device and configured to receive data from the at least one user, the software application is further configured to upload the data from the at least one user to the cloud infrastructure, the cloud infrastructure further configured to aggregate the data from the at least one user.

Figure 2:
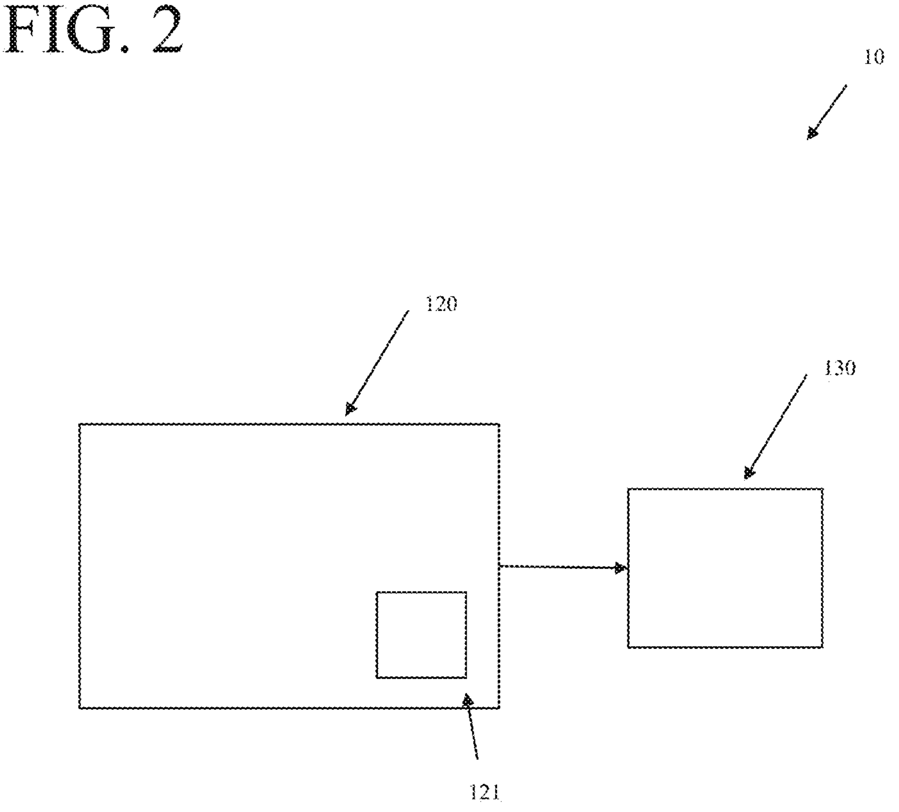
FIG. 2 is a schematic representation in block form of another portion of at least one embodiment of the present invention.

In many embodiments of the present invention, and as seen in FIGS. 1-2, the cloud infrastructure 120 comprises at least one machine learning algorithm 121. By way of non-limiting example, in such embodiments wherein the cloud infrastructure comprises at least one machine learning algorithm, the at least one machine learning algorithm is configured to analyze the data from the at least one vessel via a comparison of historical data over a predetermined period of time to establish at least one baseline measurement. In some such embodiments, the at least one machine learning algorithm initiates analyzing the relevant data as soon as the data arrives from the at least one server (i.e., to generate critical insights on vessel performance, fouling condition and/or onboard machinery health). By way of additional non-limiting example, in such embodiments wherein the present invention incorporates a software application, the software application configured to be accessed by at least one user from a client device and configured to receive data from the at least one user, the at least one machine learning algorithm is further configured to analyze the data from the at least one user via a comparison of historical data over a predetermined period of time to establish at least one baseline measurement.

In furtherance of the above, and while it is crucial to first obtain the relevant data, as may be understood, the present invention may also provide for a period of time wherein the at least one machine learning algorithm is "trained" to establish baseline values for comparison thereto. By way of non-limiting example, this period of time may be about six months. During this period, and by way of non-limiting example, the system of the present invention may adjust and calibrate to the specific operational characteristics of the at least one vessel by utilizing the incoming data. To expedite this process, historical data related to vessel performance, fouling, and machinery maintenance may be utilized. This historical data may allow the at least one machine learning algorithm (e.g., both ML and standard optimization) to quickly learn and adapt, thereby shortening the time needed to generate accurate and actionable insights.

Figure 11:
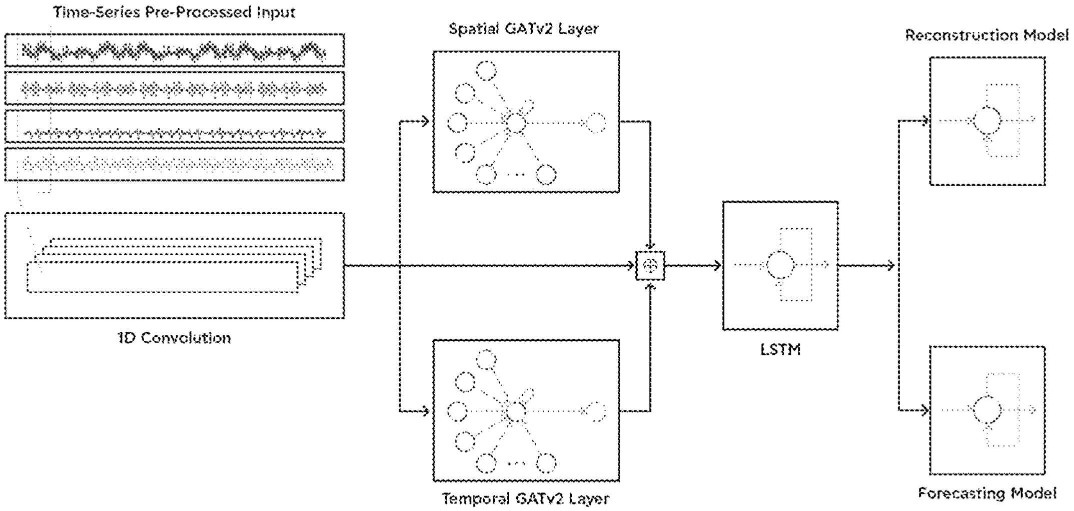
FIG. 11 is a schematic representation of at least one embodiment of the present invention.

For the purposes of so-called electrical PdM, historical data may be essential for setting up one or more baselines, trying to assess the current state of the at least one vessel's electrical machinery, and also identifying potential faults that occurred in the past. The desired result of this process may be analytical thresholds (frequency-threshold pairs) per electrical sensor per electrical machine, so that anomaly detection can be performed on live data to assess if the condition of the one or more machines (e.g., at least one electrical machine) remains constant over time or starts deteriorating. Using published, peer-reviewed literature, the present invention may be able to identify patterns in the evolution of FFT magnitudes at specific frequency bands over time and characterize them as faults. In particular, the present invention may even be able to identify specific types of faults, depending on the recognized pattern. For the purposes of so-called generic PdM, a more generic and automated analysis approach may be followed, as it may need be able to incorporate many different types of systems or machines. More specifically, a multivariate time-series anomaly detection (MVAD) model may be utilized to automatically identify faults in sets of time-series. In this regard, the architecture of one such model is illustrated in FIG. 11. The time-series data may pass through a 1-dimensional (1-D) convolutional filter for feature engineering, and then may be fed to two distinct graph attention network (GATv2) layers so that information about the spatial and temporal correlations between them can be extracted. The produced results then may pass through recurrent neural networks, and the entire architecture may be trained to jointly predict the next time-series values via forecasting and reconstruction. Depending on how far off the predicted values are in comparison to the actual measured values from the sensors, anomalies can be identified.

With the above understood, training the at least one machine learning algorithm is essential before the at least one machine learning algorithm can perform inference on live data. Notably, even though the training process may be expedited in certain circumstances, providing past examples of system failures is not a prerequisite for the at least one machine learning algorithm of the present invention. Instead, the at least one machine learning algorithm may be trained with time-series data that corresponds to the normal or practically normal operation of the respective system(s). Based on this, the at least one machine learning algorithm may be able to predict which values or patterns are significantly different from what is considered normal, and, accordingly, classify them as faults.

For the analysis of historical data, all aforementioned historical data collections are utilized (general particulars; reports, such as noon reports; AIS; weather; crew reports; etc.) along with several vessel geometric parameters which are required for the at least one machine learning algorithm. In this regard, the present invention utilizes a custom-made application which is employed for the digitalization of existing data collection and the entry of human-calculated geometric parameters—thereby breaking down the historical data into several discrete values (e.g., several day-spanning trips).

Based on the geometric parameters of the at least one vessel and specific weather conditions along the historical routes, an initial estimation of the brake horsepower (BHP) may be calculated. BHP is derived from several components of the forces acting on the at least one vessel during operation in open sea. These components include the smooth surface resistance of the at least one vessel during calm weather, encompassing frictional, wave-making, viscous pressure, bulbous bow, and appendage resistances. These resistances may be initially estimated using the Holtrop and Mennen method.

In calm water resistance, the present invention provides for the application of time and sea environment-dependent excess roughness due to fouling and paint/surface deterioration. The initial calculation of these factors may be estimated using a population evolution model of species contributing to the fouling effect (e.g., barnacles, algae, and mussels). The evolution model may consider the sea environment during the vessel route (e.g., temperature and salinity), species properties and cross-competition, and antifouling methods used by the respective crew(s). The fouling evolution may be validated through diver reports, and when the hull is cleaned, the excess roughness is reset to baseline based on the at least one vessel's dry-docking history.

The evolution model may estimate species coverage and geometrical properties, which may then be transformed into an excess surface resistance coefficient contributing to the total resistance. Finally, the present invention may provide for an estimation of the weather contribution to the resistance using the ITTC-75 vessel type-specific air resistance model and the CTH vessel-wave interaction model.

The estimated BHP may be transformed into engine power consumption using the hull and propeller efficiency coefficient. This coefficient may be estimated using the Holtrop and Mennen method, corrected for the thrust loading coefficient for the specific propeller properties, and the effect of fouling on the propeller blades. The engine power consumption may then be converted into fuel consumption using the engine efficiency curve, which depends on the engine load. The engine efficiency curve may be validated by converting it into the specific fuel oil consumption (SFOC) based on the calorific value of the fuel type reported by the respective crew(s). This sequence of computations may result in several observable variables: fouling evolution, power consumption, SFOC, and fuel consumption. These observables may then be compared with the historical data to estimate the residuals.

The present invention may further assist at least one user (of the software application of the present invention) in visualizing trip data, analyzing model-independent insights, and configuring several meta-parameters of the models at play. The visualizations may display all trip details (e.g., location, velocity, weather, trim, crew comments, fuel and power consumption of main and auxiliary engines, fueling and wastes, etc.), and may provide insights into fouling evolution by estimating total fuel energy consumption over time and the trim effect by comparing total fuel energy consumption with different trim angles. One or more users may be able to adjust different model configurations and parameters for wave resistance and hull/propeller efficiency.

Another feature of the present invention is the ability to choose weather data that differs from crew reports and compare it with different weather services. As data and models have intrinsic and extrinsic uncertainties, the present invention may introduce one or more models that use specific vessel features and data to fit any residuals. By discerning training and validation sets of data and residuals, the present invention may infer vessel-specific parameters, which may be written to the database. One of the most important factors in the uncertainty of vessel performance is the trim, as no universal model exists in the literature at present. In its first iteration, the models of the present invention may estimate the trim effect and then any other residuals.

Figure 3:
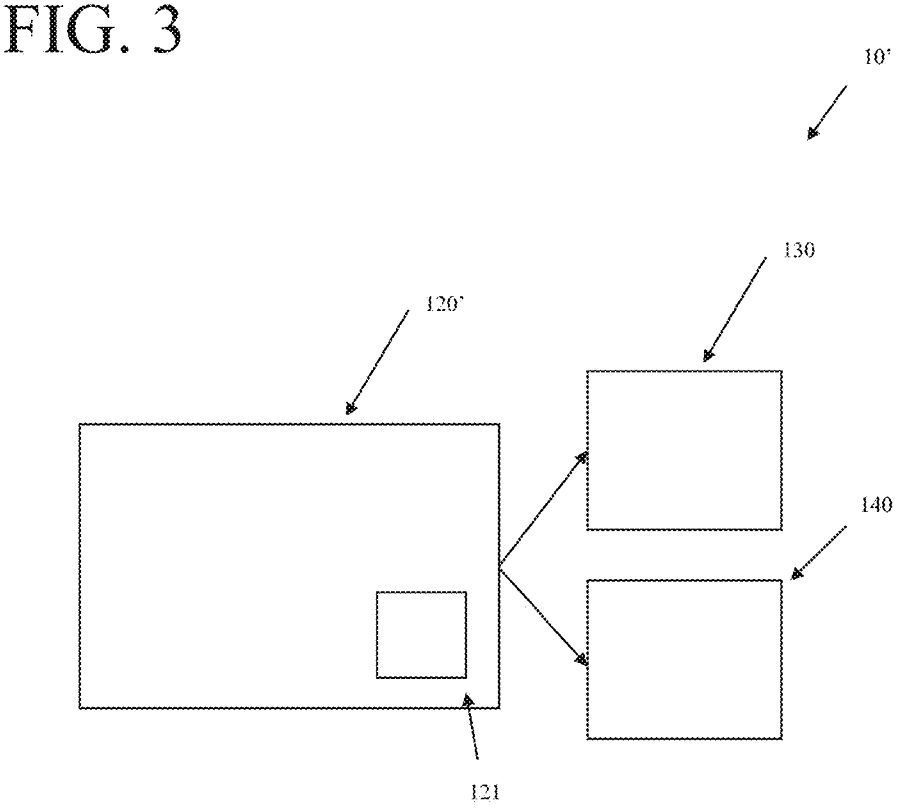
FIG. 3 is a schematic representation in block form of a portion of at least one other embodiment of the present invention.
Figure 4:
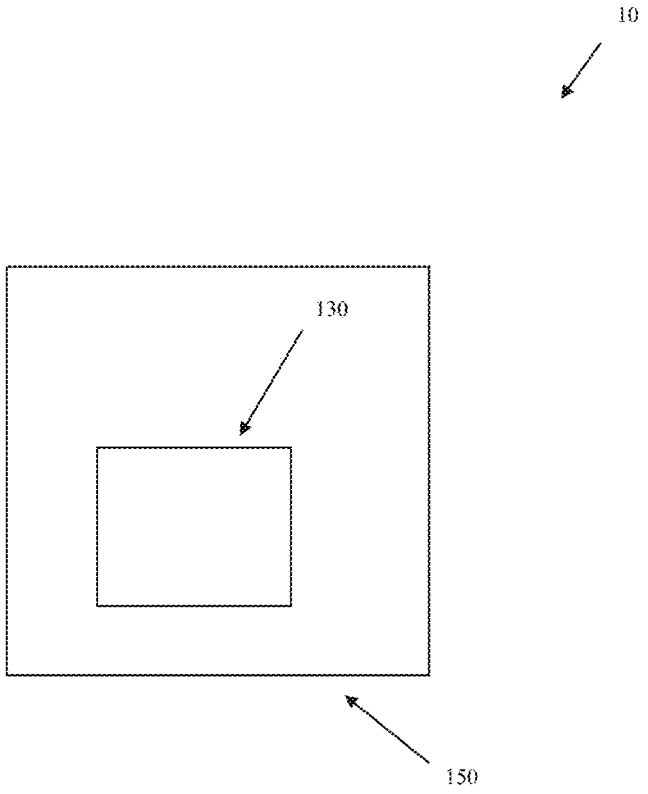
FIG. 4 is a schematic representation in block form of another portion of at least one embodiment of the present invention.
Figure 5:
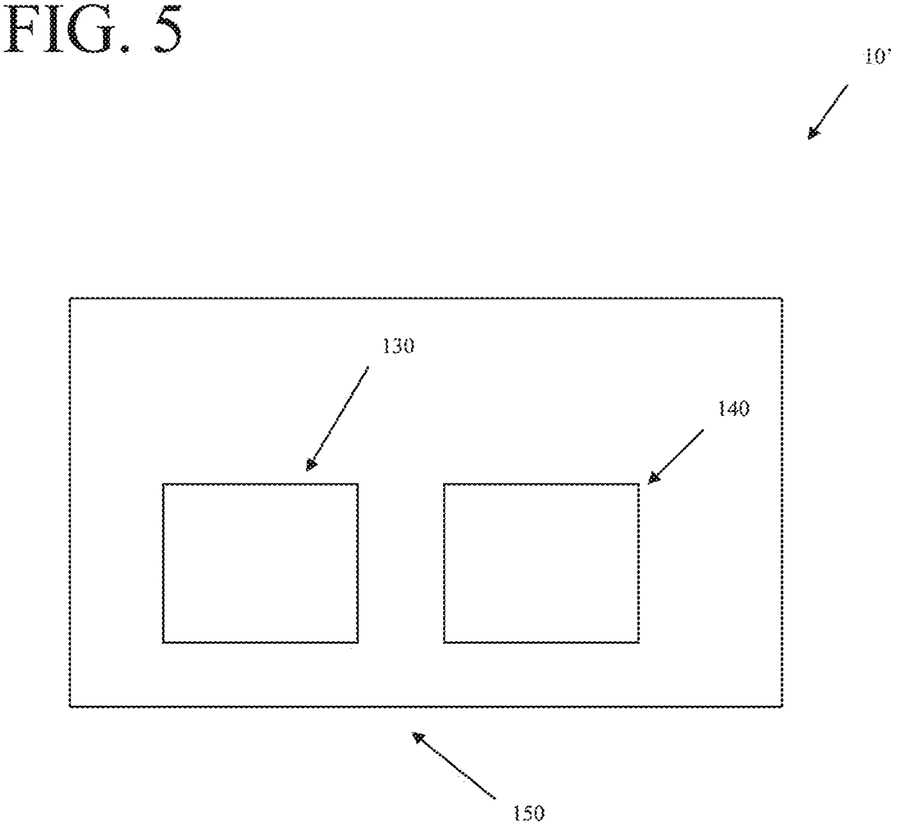
FIG. 5 is a schematic representation in block form of another portion of at least one other embodiment of the present invention.

Furthermore, and as seen via a combination of FIGS. 2 and 4, many embodiments of the present invention provide that the cloud infrastructure 120 is further configured to generate at least one maintenance insight 130 about the at least one vessel 20, the at least one maintenance insight 130 stored in at least one virtual database 150 and, in some cases, comprising information about at least one electrical machine aboard the at least one vessel. By way of non-limiting example, as seen via a combination of FIGS. 3 and 5, in such embodiments wherein the present invention incorporates a software application, the software application configured to be accessed by at least one user from a client device and configured to receive data from the at least one user, the cloud infrastructure 120' is further configured to generate at least one other insight 140, the at least one maintenance insight 130 and the at least one other insight 140 stored in at least one virtual database 150. By way of additional non-limiting example, the at least one other insight may comprise fouling and/or performance information about the at least one vessel. In general, however, in many embodiments of the present invention wherein the cloud infrastructure generates at least one insight, whether it be at least one maintenance insight and/or at least one other insight, the at least one maintenance insight and/or at least one other insight may each comprise at least one qualitative insight and at least one quantitative insight. In several cases, the storage of the at least one insight (i.e., the at least one maintenance insight and/or at least one other insight) may connect to the software application of the present invention (i.e., the at least one insight feeds the "backend" of the software application for user viewing).

With regard to the cloud infrastructure itself, and by way of non-limiting example, the cloud infrastructure's "pipeline" may be composed of a multi-hop data processing structure, known as a "medallion architecture." The term "multi-hop" is used to explain that data are serially processed in multiple levels, whereas the term "medallion" implies that these levels are namely the Bronze, Silver and Gold Layer. For the purposes of receiving, storing and handling data, as well as managing workloads, a Lakehouse architecture may be employed, which combines the storing capabilities of a Data Lake (i.e., a repository of data in their original raw form) with the data management of a data warehouse (i.e., an organized set of structured data).

Figure 12:
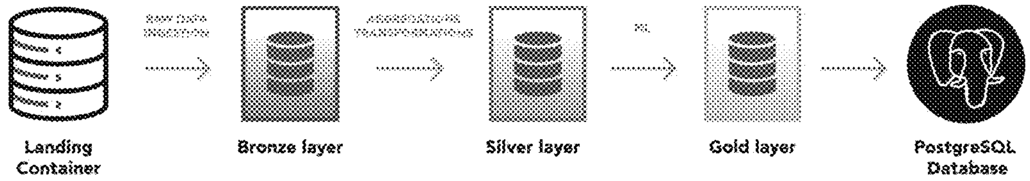
FIG. 12 is a schematic representation of at least one embodiment of the present invention.

The data processing may commence with the arrival of new CSV files containing time-series data inside a "landing" ADLS container. Upon this arrival, a trigger is activated, which may prompt the "pipeline" for processing the data contained in the respective ingested file(s), as seen in FIG. 12. This data may correspond to time-dependent measurements of various sensors (e.g., the at least one data acquisition device) that have been installed aboard the at least one vessel. Each sensor may be mapped to a specific subsystem where it resides, along with other sensors.

The purpose of the Bronze Layer may be the ingestion of the raw CSV file data. As a failsafe, each file may be checked to determine whether the file contains any new sensors or subsystems (for example, if a new subsystem has been added, or if a new sensor has been recently installed on the at least one vessel) that have been not recorded in the Lakehouse or the PostgreSQL database. On the condition that a new sensor and/or subsystem is detected, it is added to the existing Lakehouse and written in the database. The second step may be the calculation of the running hours corresponding to each sensor, which is equal to the time interval that the sensor is considered to be operational. After initial ingestion, the objective of the Silver Layer may be to pre-process the data and prepare the data for machine learning workloads. During this processing, sensor-specific parameters that are determined based on each sensor's details may be applied to the corresponding data. The pre-processing procedure involves sensor-specific aggregations, transformations (e.g. min-max scaling), as well as compilation of new datasets which can be directly fed to the one or more machine learning models. Using the fine-grained data of the Silver Layer, the aforementioned at least one machine learning algorithm is utilized for inference. Based on its training, it classifies each data point corresponding to a single timestamp as anomalous or normal. The results of the at least one machine learning algorithm's application are then written in the architecture's Gold Layer, so that they can be fed to the PostgreSQL database and, through it, displayed in the software application.

Figure 13:
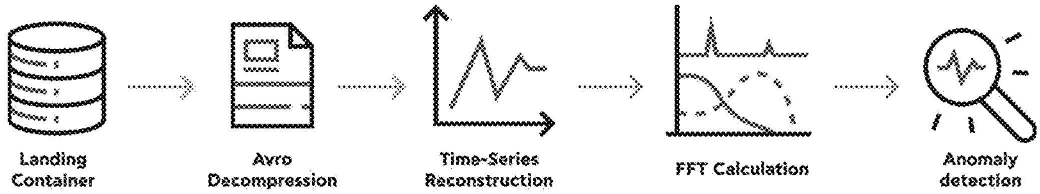
FIG. 13 is a schematic representation of at least one embodiment of the present invention.

When it comes to live electrical PdM processing pipeline, as seen in FIG. 13, it may be initiated by a trigger that fires whenever new files appear in a landing container of the Data Lakehouse. These files correspond to the compressed data created by the aforementioned at least one server aboard the at least one vessel and uploaded to the cloud infrastructure from the at least one vessel.

The first step of the pipeline may be the extraction of the metadata embedded in the respective files. This metadata is written by the at least one server's services during the initial compression of the files and are essential for their decompression and consequent reconstruction of the time-series they contain. In particular, they correspond to a scaling factor used to transform the data into integers, the sampling rate of the data acquisition device, as well as the timestamps corresponding to the beginning and the end of the sampling process. The reason why redundant information is included in the metadata (since the end of the sampling process can be inferred through the volume of data, the timestamp corresponding to the beginning of the sampling process and the sampling rate) is purely related to sanity checks when it comes to the quality of the received data.

Using this metadata, the original time-series can be reconstructed for each sensor included in each file. Then, a Fast Fourier Transform (FFT) may be applied on each time-series individually to obtain the magnitudes of their corresponding frequencies across the entire frequency spectrum. The magnitudes may be normalized, so that they can be compared to the results obtained from other respective files. This transformed data may be utilized to identify potential issues in the at least one electrical machine, by comparing them to previous readings as well as the baselines that were created during the processing of historical data and the baselines published in peer-reviewed literature. This constitutes the "anomaly detection" task for the electrical PdM problem.

Apart from the FFT transformation, the Total Harmonic Distortion (THD) of the signal may also be calculated from the pipeline. Even though it is not a self-sufficient diagnostic tool, the THD can be used in conjunction with observations on the FFT-transformed results to increase the certainty of classifying at least one electrical machine's current state as potentially faulty or not. All calculated results are written in the PostgreSQL database which feeds the software application's backend, so that they can be served to the at least one user of the software application, including explanations about possible identified faults.

Moreover, through use of the present invention, the management of biofouling documentation, including filling out, maintaining, and tracking the BFMP and BFRB, is simplified. Based on the at least one vessel details provided through one or more reports, and by acquiring additional information about the at least one vessel through relevant application forms, a comprehensive profile of the at least one vessel's fouling management is created. The operational profile of the at least one vessel is defined, acting as the basis for selecting the AFS. The at least one user may declare any existing hull and niche areas where biofouling may occur on the at least one vessel, and documents any procedures done on the at least one vessel, such as installations and cleanings. This can be done either by filling the relevant form or by directly uploading crew and diver reports to the software application.

To retrieve useful data for the BFMP, BFRB, and vessel performance models described earlier, state-of-the-art technologies such as optical character recognition (OCR), Large Language Models (LLM), and retrieval-augmented generation (RAG) may be used. If the input is in a handwritten report or image, OCR may be used to extract the text information. The final dataset, describing all the information regarding fouling condition, evolution, and preventive measures strategies, may be stored in the at least one virtual database and can be retrieved at will.

After acquiring all the necessary information, a custom-made internal software application may be used to produce the contents of the BFMP and BFRB. The at least one vessel particulars, operational profile, and hull and niche areas of the at least one vessel are loaded and presented in tables. The AFS properties may be formulated based on the provided installation information, using LLMs, separately for the selected AFC and MGPS, along with the relevant areas and dates of installment, and the means and frequency of required maintenance. Planned management actions required per ship area may be formulated using LLMs, along with any additional procedures proposed by the IMO (considering waste management, safety procedures, and crew familiarization).

Via use of the above, all of the above-noted information may be neatly organized into a single PDF document that constitutes the ship-specific BFMP document required by the IMO. The list of actions relevant to installations and cleaning procedures may be organized in another table, in chronological order, which constitutes the BFRB.

This comprehensive digital approach, which can be applied to specific vessels, allows for improved decision-making on maintenance and cleaning, optimizing fouling management by automating processes, refining monitoring and forecasting capabilities, and enabling the creation of a digital twin of the at least one vessel's operational profile. This maintains optimal ship operation with minimal crew involvement, thereby optimizing overall maritime operations.

Lastly, as it relates to the software application of the present invention, the software application may itself comprise at least one page, and, in some embodiments, up to six distinct pages. By way of non-limiting example, the software application may itself comprise a data input page, designed to streamline the process of submitting reports and other pertinent data; an overview page, the overview page configured to present a map with the last reported location of the at least one vessel available to the at least one user (i.e., depending on their access); a predictive maintenance page, which is configured to offer a review of the at least one vessel's subsystems and their working conditions; a fouling page, the fouling page configured to handle the relevant data and info related to the fouling of the at least one vessel, thereby simplifying its management and boosting operational efficiency; a compliance page, the compliance page configured to depict the at least one vessel's current CII score, as well as a detailed breakdown of its values across the months of a given year; and performance optimization page, the performance optimization page configured to depict the at least one vessel's baseline power as a function of velocity and engine efficiency curves together with the data obtained from the respective crew(s) through the reporting features offered by the present invention.

Figure 7:
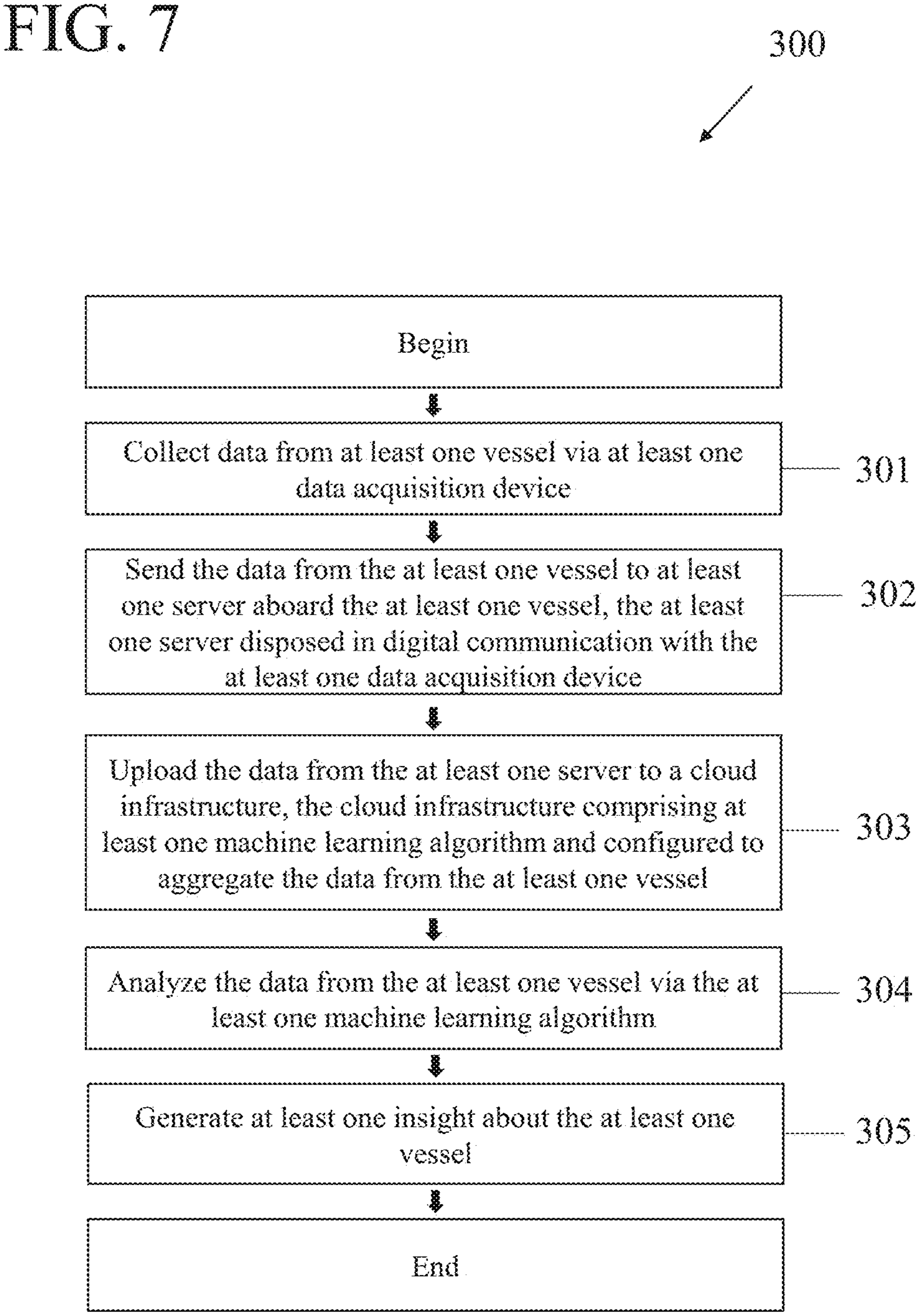
FIG. 7 is a schematic representation in block form representing at least one method embodiment of the present invention.

The attendant method of the present invention, on the other hand—seen in FIG. 7—includes a method for maritime asset management 300. In this regard, one or more embodiments of the present invention include a method 300 comprising: collecting data from at least one vessel via at least one data acquisition device 301; sending the data from the at least one vessel to at least one server aboard the at least one vessel, the at least one server disposed in digital communication with the at least one data acquisition device 302; uploading the data from the at least one server to a cloud infrastructure, the cloud infrastructure comprising at least one machine learning algorithm and configured to aggregate the data from the at least one vessel 303; analyzing the data from the at least one vessel via the at least one machine learning algorithm 304; and generating at least one insight about the at least one vessel 305. As explained herein, and by way of non-limiting examples, the attendant method of the present invention may comprise an at least one server that is further configured to compress the data from the at least one vessel; and the generation of at least one insight which itself comprises at least one qualitative insight and at least one quantitative insight—and, in at least some embodiments, at least one insight which itself comprises at least one maintenance insight about the at least one vessel and at least one other insight. Moreover, the attendant method of the present invention may further comprise uploading data from at least one user of a software application to the cloud infrastructure, the software application configured to be accessed by at least one user from a client device and to receive data from the at least one user. In such an embodiment, the cloud infrastructure may be further configured to aggregate the data from the at least one user. Continuing on, such an embodiment may further comprise the step of analyzing the data from the at least one user via the at least one machine learning algorithm.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for maritime asset management comprising:

at least one data acquisition device, said at least one data acquisition device configured to collect data from at least one vessel and configured to measure at least one of strain, ultrasonic signals, acceleration, vibrations, thermal properties, viscosity, currents, and voltages of at least one electrical machine aboard the at least one vessel, at least one server aboard the at least one vessel, said at least one server disposed in digital communication with said at least one data acquisition device and configured to receive the data from the at least one vessel via said at least on acquisition device, said at least one server further configured to ingest the data from the at least one vessel, separately process data about said at least one electrical machine aboard the at least one vessel, compress the data from the at least one vessel, write at least a portion of the data into a local PostgreSQL database, periodically flush at least a portion of the data into one or more CSV files, and queue the one or more CSV files for upload, said at least one server further configured to upload the data from said at least one server to a cloud infrastructure when network conditions aboard the at least one vessel allow for upload, said cloud infrastructure configured to aggregate the data from the at least one vessel, said cloud infrastructure comprising at least one machine learning algorithm via a comparison of historical data over a predetermined period of time to establish at least one baseline measurement, wherein said separately process data about said at least one electrical machine comprises splitting raw time-series measurements into time windows and extracting RMS values therefrom before storage in a table of the local PostgreSQL database separate from generic predictive maintenance data, said at least one machine learning algorithm configured to analyze the data from the at least one vessel, said cloud infrastructure further configured to generate at least one maintenance insight about the at least one vessel, said at least one maintenance insight comprising information about said at least one electrical machine aboard the at least one vessel and comprising at least one qualitative insight and at least one quantitative insight, said at least one maintenance insight stored in at least one virtual database.

2. The system of claim 1, wherein said cloud infrastructure is further configured to generate at least one other insight.

3. The system of claim 2, wherein said at least one other insight comprises fouling and performance information about the at least one vessel.

4. A system for maritime asset management comprising:

at least one data acquisition device, said at least one data acquisition device configured to collect data from at least one vessel, wherein the collecting comprises measuring at least one of strain, ultrasonic signals, acceleration, vibrations, thermal properties, viscosity, currents, and voltages of at least one electrical machine aboard the at least one vessel, at least one server aboard the at least one vessel, said at least one server disposed in digital communication with said at least one data acquisition device and configured to receive the data from the at least one vessel via said at least one data acquisition device, said at least one server further configured to upload the data from said at least one server to a cloud infrastructure, said cloud infrastructure configured to aggregate the data from the at least one vessel, separately processing data about said at least one electrical machine aboard the at least one vessel, compressing the data from the at least one vessel, writing at least a portion of the data into a local PostgreSQL database, periodically flushing at least a portion of the data into one or more CSV files, and queueing the one or more CSV files for upload, a software application configured to be accessed by at least one user from a client device, said software application configured to receive data from said at least one user, said software application further configured to upload the data from said at least one user to said cloud infrastructure, said cloud infrastructure further configured to aggregate the data from said at least one user, said cloud infrastructure comprising at least one machine learning algorithm, said at least one machine learning algorithm configured to analyze the data from the at least one vessel and from said at least one user via a comparison of historical data over a predetermined period of time to establish at least one baseline measurement, wherein said separately process data about said at least one electrical machine comprises splitting raw time-series measurements into time windows and extracting RMS values therefrom before storage in a table of the local PostgreSQL database separate from generic predictive maintenance data, said cloud infrastructure further configured to generate at least one maintenance insight about the at least one vessel and at least one other insight, wherein said at least one maintenance insight comprises information about said at least one electrical machine aboard the at least one vessel, wherein said at least one other insight comprises fouling information and performance information about the at least one vessel, and wherein said at least one maintenance insight and said at least one other insight each comprise at least one qualitative insight and at least one quantitative insight, said at least one maintenance insight and said at least one other insight stored in at least one virtual database.

5. A method for maritime asset management comprising:

collecting data from at least one vessel via at least one data acquisition device, wherein the collecting comprises measuring at least one of strain, ultrasonic signals, acceleration, vibrations, thermal properties, viscosity, currents, and voltages of at least one electrical machine aboard the at least one vessel, sending the data from the at least one vessel to at least one server aboard the at least one vessel, the at least one server disposed in digital communication with the at least one data acquisition device, separately processing data about said at least one electrical machine aboard the at least one vessel, compressing the data from the at least one vessel, writing at least a portion of the data into a local PostgreSQL database, periodically flushing at least a portion of the data into one or more CSV files, and queueing the one or more CSV files for upload, uploading the data from the at least one server to a cloud infrastructure, the cloud infrastructure comprising at least one machine learning algorithm and configured to aggregate the data from the at least one vessel, wherein the uploading is performed when network conditions aboard the at least one vessel allow for upload, analyzing the data from the at least one vessel via the at least one machine learning algorithm, via a comparison of historical data over a predetermined period of time to establish at least one baseline measurement, wherein said separately processing data about said at least one electrical machine comprises splitting raw time-series measurements into time windows and extracting RMS values therefrom before storage in a table of the local PostgreSQL database separate from generic predictive maintenance data, and generating at least one insight about the at least one vessel, wherein said at least one insight comprises at least one maintenance insight about the at least one vessel and at least one other insight, wherein said at least one maintenance insight comprises information about said at least one electrical machine aboard the at least one vessel, wherein said at least one other insight comprises fouling information and performance information about the at least one vessel, and wherein said at least one insight comprises at least one qualitative insight and at least one quantitative insight.

6. The method of claim 5, further comprising uploading data from at least one user of a software application to the cloud infrastructure, the software application configured to be accessed by at least one user from a client device and to receive data from the at least one user.

7. The method of claim 6, wherein the cloud infrastructure is further configured to aggregate the data from the at least one user.

8. The method of claim 7, further comprising analyzing the data from the at least one user via the at least one machine learning algorithm.

9. The method of claim 8, wherein the at least one insight comprises at least one maintenance insight about the at least one vessel and at least one other insight.

* * * * *